United States Patent [19]

Fogle

[11] 4,269,098
[45] May 26, 1981

[54] PORTABLE BAND SAW

[76] Inventor: Peter H. Fogle, 1552 B Washington St. East, Charleston, W. Va. 25311

[21] Appl. No.: 110,317

[22] Filed: Jan. 8, 1980

[51] Int. Cl.³ .............................................. B23D 53/06
[52] U.S. Cl. ........................................ 83/733; 83/796
[58] Field of Search ................... 83/411 R, 733, 788, 83/796, 809, 439

[56] References Cited

U.S. PATENT DOCUMENTS 1,287,193  12/1918  Berry .................................... 83/796

*Primary Examiner*—J. M. Meister
*Attorney, Agent, or Firm*—Sughrue, Rothwell, Mion, Zinn and Macpeak

[57] ABSTRACT

A portable band saw comprising a base having upstanding supports integral therewith, a U-shaped frame is pivotally supported on one of the upstanding supports, said frame has a pair of spaced apart pulley wheels rotatably attached thereto. A saw blade extends between the pulley wheels and is rotatable thereabout, and guide means is utilized whereby the saw blade extends therethrough and is guided and supported thereby. A motor, having a drive shaft, is attached to the U-shaped frame, said drive shaft is connected to one of the pulley wheels thereby rotating same and the saw blade which extends thereabout upon starting of the motor. A pivotable saw table having an arcuate slot therein is utilized to advance work to be cut toward the rotating saw blade. The U-shaped frame together with the pulley wheels, saw blade, saw blade guide and motor is removable as a unit from the outstanding support and usable in a fashion similar to other band saws.

7 Claims, 3 Drawing Figures

PORTABLE BAND SAW

BACKGROUND OF THE INVENTION

Field of the Invention

This invention relates to a portable band saw which utilizes a continuous saw blade rotatable between two pulley wheels one of which is driven by a motor.

SUMMARY OF THE INVENTION

One of the objects of this invention is to provide a portable band saw of the type wherein a continuous saw blade rotates about a pair of spaced apart pulley wheels. A pivotable U-shaped frame supports the pulley wheels in spaced apart relationship, and a saw blade extends about the pulley wheels for rotation thereabout. The saw blade is guided and supported by guide means attached to said frame. A motor, having a drive shaft extending therefrom, is supported on the U-shaped frame and said drive shaft which is connected to one of the pulley wheels effects rotation of the saw blade which extends about both pulley wheels. A table saw having an arcuate slot therein is pivotally supported on a support. As the work table, supporting a piece of work, is pivoted toward the rotating saw blade, the blade enters the arcuate slot and cuts the work at an angle. Another object is to provide a saw table which may be held stationary in work supporting relationship relative to the saw blade, an arcuate slot may be positioned in the opposite edge of the flat plate and the U-shaped frame carrying the motor, pulley wheels, saw blade and saw blade guide pivoted toward the saw table thus cutting work thereon.

It is an other object of the present invention to provide a new and improved band saw not hereto before known.

A further object of the present invention is to provide a portable band saw which is inexpensive, light in weight and easy to handle.

Other and related objects and advantages of the present invention will be apparent from the following description.

Figure 1:
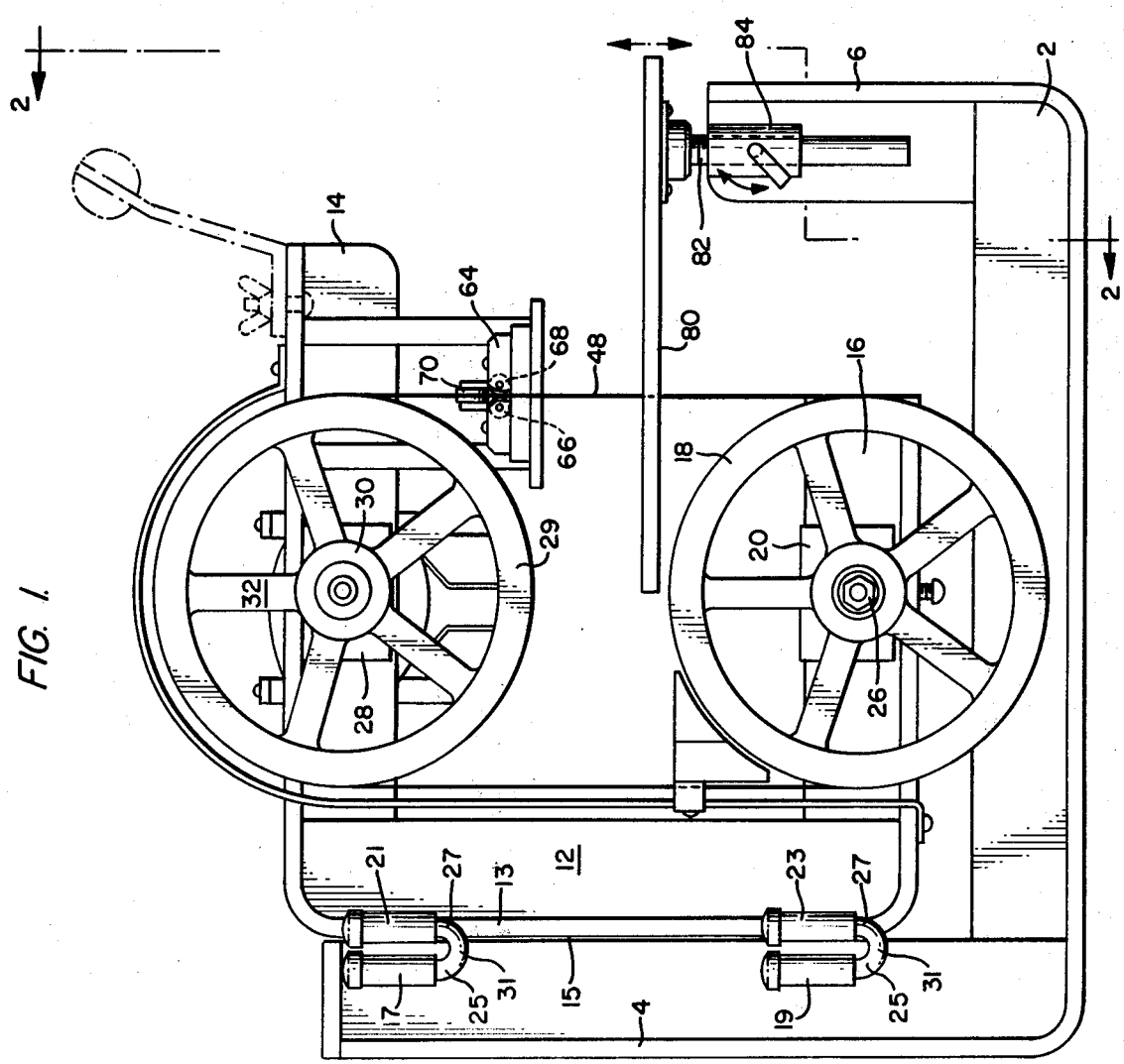
FIG. 1 is a side elevational view of the band saw.

Referring in detail to the drawings, a portable band saw shown in FIG. 1, has a base 2, a first upstanding support 4 and a second upstanding support 6 integral with the base. The base 2 is provided with apertures 8 for facilitating securing the saw to any suitable support. A cross bar 10 is secured to the base 2 and the upstanding supports 4 and 6 to lend structural strength to the base and supports. Upstanding support 4 has a pair of hollow cylindral tubes 17 and 19 rigidly secured thereto by suitable means as by welding or the like.

A U-shaped frame has a vertical side 12 and horizontal arms 14 and 16 extending from either end of the vertical side 12. The vertical side 12 has an edge 13 and a flat face 15. Edge 13 has a pair of hollow cylindral tubes 21 and 23 rigidly attached thereto and identical with cylindral tubes 17 and 19. A pair of U-shaped members each having legs 25 and 27 are utilized to pivotally support the U-shaped frame on the upstanding support 4 by having legs 25 rigidly secured in cylindral tubes 17 and 19, and legs 27 snugly fitting within cylindral tubes 21 and 23, yet permitting pivotable movement of the U-shaped frame on legs 27. A pulley wheel supporting block 20, having a threaded aperture therethrough, is secured to arm 16 by suitable means, as by welding or the like. A pulley wheel 18 is provided with a hub 22 and a plurality of spokes 24. Hub 22 has an aperture therethrough whereby a bolt 26 or the like is utilized and extends through the aperture in the hub 22 and into the threaded aperture provided in block 20 and into similarly threaded aperture provided in arm 16 thereby rotatably attaching the pulley 18 to the block 20 and the arm 16.

A pulley wheel supporting block 28, having an aperture therethrough, is secured to arm 14 by suitable means, as by welding or the like. A pulley wheel 29 is provided with a hub 30 and a plurality of spokes 32. Hub 30 has an aperture therethrough whereby the pulley wheel 29 is rotatably attached to the block 28 and arm 14, to be more fully explained below.

Figure 2:
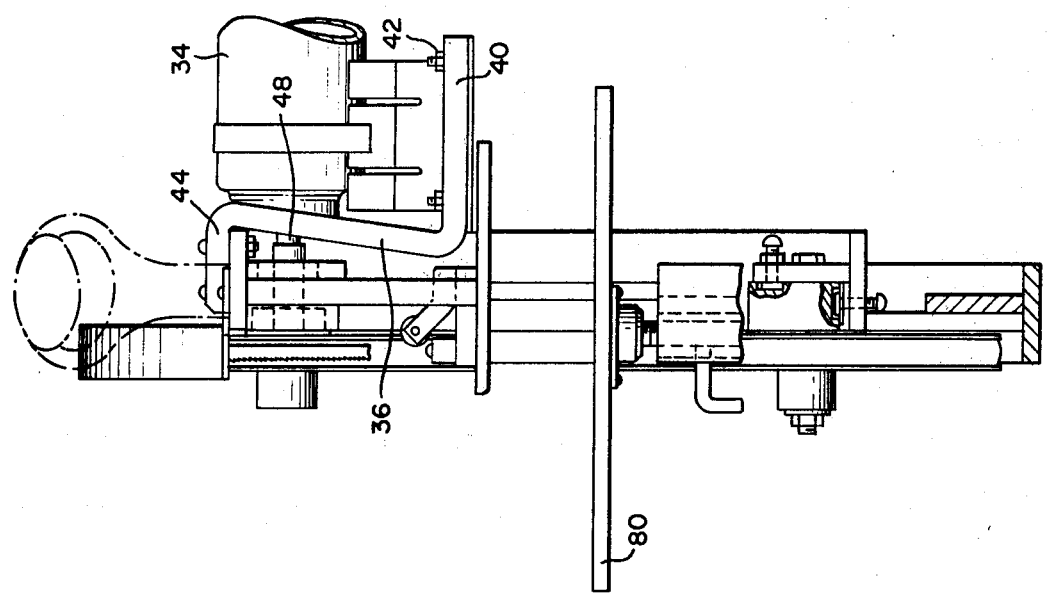
FIG. 2 is an end view taken along the line 2—2 of FIG. 1.

A motor 34 FIG. 2, is attached to the U-shaped frame by a pair of Z-shaped bars 36 (one shown) attached at one end 40 to the motor by bolts 42 or the like and at the other end 44 to arm 14 by suitable means. Motor 34 has a drive shaft 46 extending therefrom as best seen in FIG. 2, said shaft extends through an aperture in arm 14 and the aperture in block 28, and the end of said shaft being nonrevolvably secured in the aperture in hub 30 whereby the pulley wheel 29 is rotatable with the shaft upon operation of the motor.

A saw blade having sides 47 and 48 and edge 49 extends between the pulley wheels 18 and 29 and is rotatable thereabout upon rotation of the motor drive shaft 46. A saw blade guide 50 has a horizontal plate 52 FIG. 3, having a slot in one edge 56. The slot has side edges 58 and a back edge 60. A pair of plates 62 and 64, having slots in their edges similar to the slot in plate 52 are arranged vertically and in step like fashion with the respective slots aligned with each other so that the blade 48 passes therebetween. A pair of rollers 66 and 68, as best seen in FIG. 1, are rotatably attached to plates 64 by suitable means and provide rotatable guide means between which the sides of the saw blade passes in contact therewith. A third roller 70 is attached to the plate 64 and defines a rotatable support for the edge 49 of the blade. Rollers 66, 68 and 70 define the guide means whereby as the saw blade rotates about the pulley wheels, the saw blade passes between and in contact with the rollers 66, 68 and 70 thus lending stability and support to the rotating saw blade.

A pair of spaced apart bars 72 and 74 are attached at one end to plate 52 and at the other end to arm 14 thereby rigidly securing the saw blade guide 50 to arm 14. A handle 76 is secured to arm 14 by suitable means, whereby the U-shaped frame, pulley wheels, saw blade guide and motor may be manually pivoted on the first upstanding support. The U-shaped frame together with the pulley wheels, saw blade, saw blade guide and motor thus supported on the first upstanding support may be removed as a unit by merely raising the U-shaped up and off its support.

Figure 3:
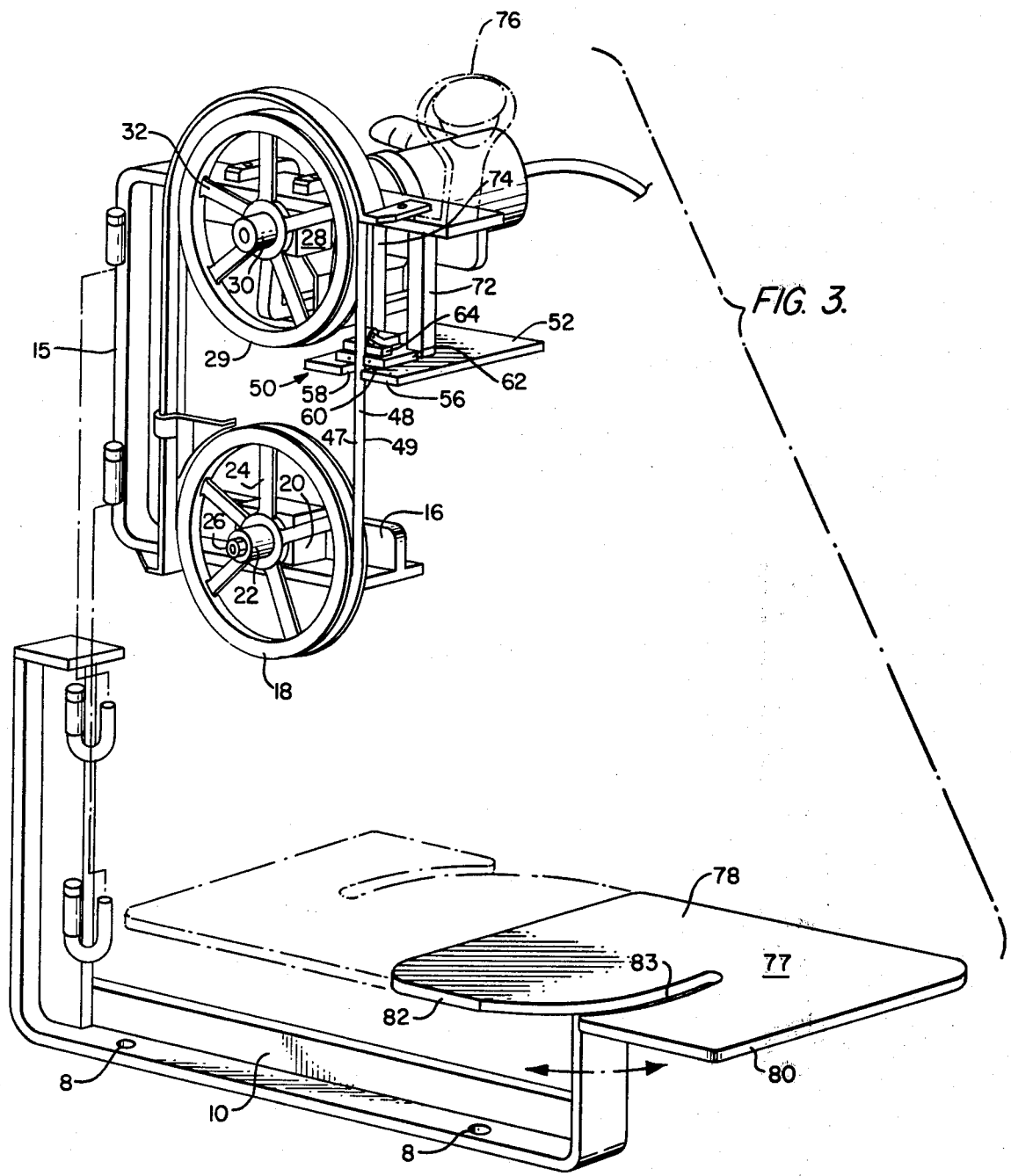
FIG. 3 is a perspective view showing the saw disengaged from the support and the work table pivoted on the support.

A saw table 77 comprises a flat plate having a top side 78, a bottom side 80 and an edge 82. Edge 82 has an arcuate slot 83 cut therein, said slot extending inwardly into the flat plate. Bottom side 80 has a support rod 82 rigidly secured thereto at one end thereof by suitable means, FIG. 2. A hollow cylindral tube support means 84 is rigidly secured to the second upstanding shaft 6. Rod 82 is slideably received within cylindral tube 84 and is pivotable thereabout. The saw table thus supported is pivoted into the phantom position when work is being cut as seen in FIG. 3, and into the solid line position after the work is cut.

In operation, with the U-shaped frame supported on the first upstanding support and utilizing handle 76, the operator pivots the U-shaped frame fully counterclockwise until flat face 15 of the vertical side 12 abuts against the first upstanding support, thus stopping the U-shaped frame from further movement counterclockwise. Motor 34 is started whereupon drive shaft 46 turns thus turning pulley wheels 29. The saw blade 48 begins to turn about the pulley wheels and is guided and supported by the saw blade guide 50.

With the saw table 77 in the solid position, a piece of work is placed on the saw table bridging the arcuate slot 83. The operator then pivots the saw table towards the rotating saw which then enters the arcuate slot cutting the work piece at an angle. It is to be noted that the saw table may be held stationary in the phantom position, as shown, an arcuate slot provided in the opposite edge of plate 77 and the U-shaped frame together with the rotating pulley wheels, rotating saw blade, saw blade guide and motor pivoted towards the saw table whereby the rotating saw enters into the arcuate slot thus cutting a work piece at an angle.

While the invention has been illustrated and described in detail in the drawings and foregoing description, the same is to be considered as illustrative and not restrictive in character, it being understood that only the preferred embodiment have been shown and described and that all changes and modifications that come within the spirit of the invention are desired to be protected.

What is claimed is:

1. A portable band saw comprising:
 a base;
 a first upstanding support integral with the base;
 a second upstanding support integral with the base;
 a U-shaped frame pivotally supported on the first upstanding support;
 a pair of spaced apart pulley wheels having means for rotatably attaching same to the U-shaped frame;
 a saw blade extending between the pulley wheels and rotatable thereabout;
 saw blade guide means attached to the U-shaped frame for guiding and supporting the saw blade;
 a handle attached to the U-shaped frame;
 a saw table pivotably supported on the second upstanding support for supporting work to be cut; and
 a motor attached to the U-shaped frame and having a drive shaft extending therefrom and connected to one of said pulley wheels causing rotation thereof, whereby said saw blade rotates about said pulley wheels and said work is cut upon pivoting said saw table toward said saw blade.

2. A portable band saw as defined in claim 1, wherein:
 said U-shaped frame comprises a vertical side, and horizontal arms extending from either end of said vertical side;
 said vertical side having an edge and a flat face, means on said edge for pivotably supporting said U-shaped frame on said first upstanding support; and
 said flat face abutting said first upstanding support upon pivoting the U-shaped frame toward the saw table, whereby the flat face and the first upstanding support define stop means for the U-shaped frame.

3. A portable band saw as defined in claim 1, wherein:
 said saw table comprises a flat plate having an arcuate slot in one side thereof, and a support rod attached to one side of said flat plate for inserting into support means on the second upstanding support, whereby said saw table pivots on said second upstanding support.

4. A portable band saw as defined in claim 1, wherein:
 said saw blade guide comprises horizontal plates vertically arranged and having slots in the edges thereof, said slots having side edges and a back edge and in alignment with each other, and said plates being arranged in step like fashion;
 a pair of rollers rotatably mounted on one of said plates and adjacent to the side edges of the slot;
 a third roller rotatably mounted on one of said plates and adjacent to the back edge of the slot;
 said pair of rollers and said third roller bearing against the saw blade; and
 means for securing said saw blade guide to the U-shaped frame.

5. A portable band saw as defined in claim 1, wherein:
 said U-shaped frame, pulley wheels, saw blade, saw blade guide and motor being removably attached as a unti to said first upstanding support.

6. A portable band saw as defined in claim 1, wherein:
 said pulley wheels having means for rotatably attaching same in spaced apart relationship one each on the horizontal arms of the U-shaped frame;
 first guard means attached at one end thereof to one of said horizontal arms and overlying one of said pulley wheels and attached at the opposite end to said first guard means and partially overlying the other of said pulley wheels.

7. A portable band saw comprising:
 a base;
 a pair of spaced apart upstanding supports integral with the base;
 a frame pivotably supported on one of said spaced apart upstanding supports;
 said frame having a pair of spaced apart pulley wheels rotatably attached thereto;
 cutting means extending between the pulley wheels and rotatable thereabout;
 guide means attached to the frame for guiding and supporting the cutting means;
 means for manually pivoting the frame on the upstanding support;
 a motor supported on said frame and having a drive shaft attached to one of said pulley wheels for causing rotation thereof, whereby the cutting means rotates about the pulley wheels; and
 work support means having an arcuate slot therein, said work support pivotably supported on the other of said upstanding supports, work supported on said work support being cut at an angle upon pivoting the work support and work toward the cutting means, whereby said cutting means enters said arcuate slot.

* * * * *